(12) United States Patent
Dellock et al.

(10) Patent No.: US 9,821,717 B1
(45) Date of Patent: Nov. 21, 2017

(54) BOX STEP WITH RELEASE BUTTON THAT ILLUMINATES

(71) Applicant: Ford Global Technologies, LLC, Dearborn, MI (US)

(72) Inventors: Paul Kenneth Dellock, Northville, MI (US); Stuart C. Salter, White Lake, MI (US); David Brian Glickman, Southfield, MI (US); Talat Karmo, Waterford, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/157,569

(22) Filed: May 18, 2016

(51) Int. Cl.
*B60R 3/00* (2006.01)
*B60R 3/02* (2006.01)
*B60Q 1/26* (2006.01)

(52) U.S. Cl.
CPC ............. *B60R 3/02* (2013.01); *B60Q 1/2661* (2013.01)

(58) Field of Classification Search
CPC .......... B60R 3/002; B60R 3/02; B60Q 1/2661
See application file for complete search history.

(56) References Cited

U.S. PATENT DOCUMENTS

| | | |
|---|---|---|
| 5,655,826 A | 8/1997 | Kouno et al. |
| 5,709,453 A | 1/1998 | Krent et al. |
| 6,367,940 B1 | 4/2002 | Parker et al. |
| 6,375,864 B1 | 4/2002 | Phillips et al. |
| 6,604,834 B2 | 8/2003 | Kalana |
| 6,729,738 B2 | 5/2004 | Fuwausa et al. |
| 6,773,129 B2 | 8/2004 | Anderson, Jr. et al. |
| 6,851,840 B2 | 2/2005 | Ramamurthy et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Erez Gurari
(74) *Attorney, Agent, or Firm* — Jason Rogers; Price Heneveld LLP

(57) ABSTRACT

A step assembly of a vehicle is provided herein. The step assembly includes a box step having a release button that luminesces in response to excitation light and continues to luminesce for a period of time after the excitation light cease to be provided. A drive mechanism is configured to move the step pad from a stowed position to a deployed position when the release button is pressed.

16 Claims, 3 Drawing Sheets

(56) References Cited

U.S. PATENT DOCUMENTS

| | | |
|---|---|---|
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 9,315,145 B2 * | 4/2016 | Salter ................ B60Q 1/2661 |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0214386 A1 * | 9/2006 | Watson ................ B60R 3/02 280/163 |
| 2006/0267308 A1 | 11/2006 | Decker, Jr. et al. |
| 2007/0032319 A1 | 2/2007 | Tufte |
| 2007/0069497 A1 * | 3/2007 | Watson ................ B60R 3/02 280/166 |
| 2007/0176389 A1 * | 8/2007 | VanBelle ................ B60R 3/02 280/166 |
| 2007/0278760 A1 * | 12/2007 | VanBelle ................ B60R 3/02 280/166 |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0280528 A1 | 11/2012 | Dellock et al. |
| 2013/0130674 A1 * | 5/2013 | De Wind ............. B60Q 1/2619 455/420 |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0291086 A1 | 10/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

BOX STEP WITH RELEASE BUTTON THAT ILLUMINATES

FIELD OF THE INVENTION

The present invention generally relates to step assemblies of a vehicle, and more particularly, to step assemblies capable of illuminating.

BACKGROUND OF THE INVENTION

Vehicles having high clearance often feature step assemblies to assist a user in reaching various areas. A step assembly is provided herein for assisting a user in accessing a truck bed and includes a box step that is capable of illuminating to provide functional lighting as well as impart a stylistic element to the vehicle.

SUMMARY OF THE INVENTION

According to one aspect of the present invention, a step assembly of a vehicle is provided. The step assembly includes a box step having a release button that illuminates and a drive mechanism configured to move the step pad from a stowed position to a deployed position when the release button is pressed.

According to another aspect of the present invention, a step assembly of a vehicle is provided. The step assembly includes a box step having a release button that luminesces in response to excitation light and a drive mechanism configured to move the step pad from a stowed position to a deployed position when the release button is pressed.

According to yet another aspect of the present invention, a step assembly of a vehicle is provided. The step assembly includes a box step having a release button that luminesces in response to excitation light and continues to luminesce for a period of time after the excitation light ceases to be provided. A drive mechanism is configured to move the step pad from a stowed position to a deployed position when the release button is pressed.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
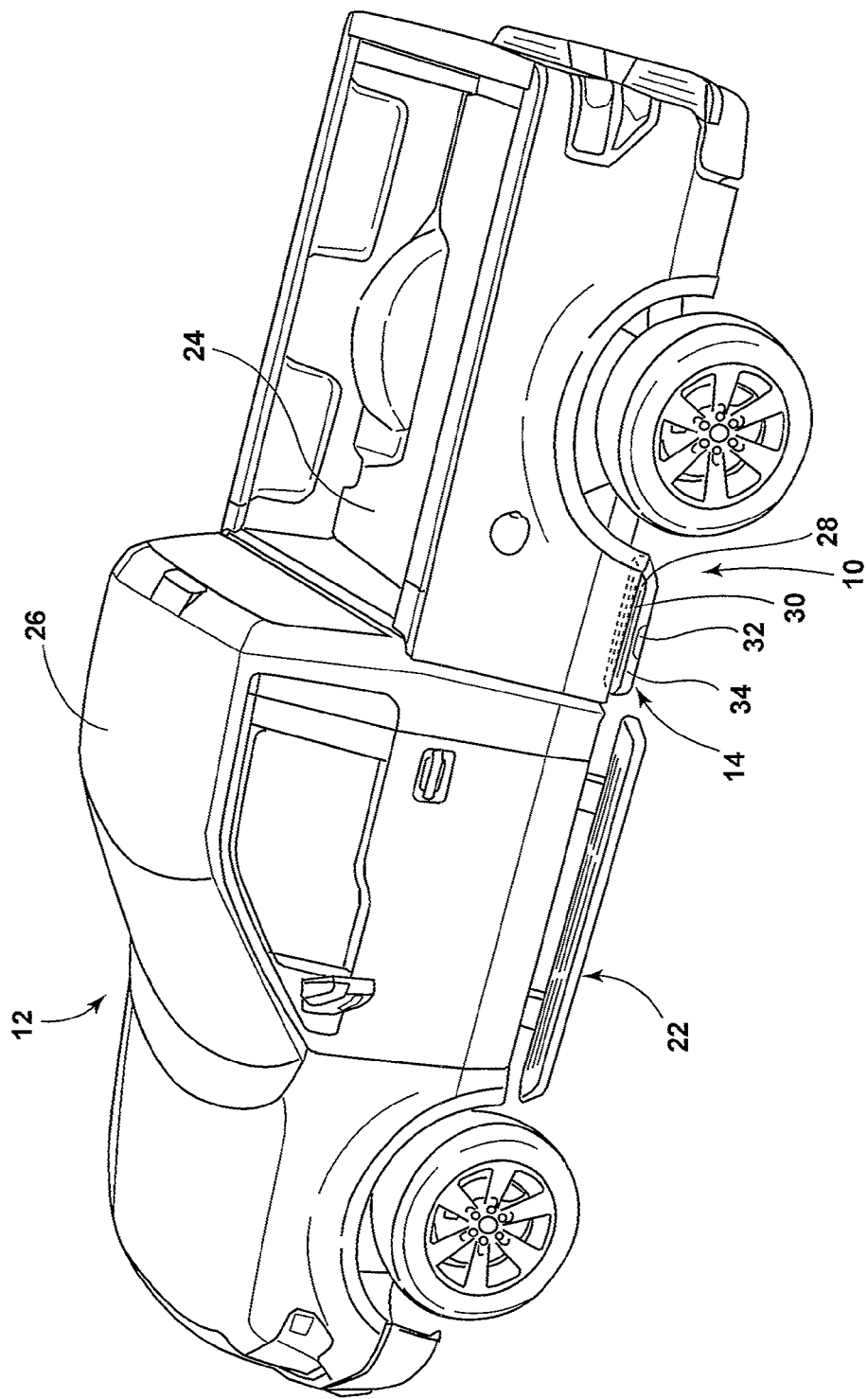
FIG. 1 is a side perspective view of a vehicle equipped with a step assembly having a box step positioned in a stowed position.
Figure 2:
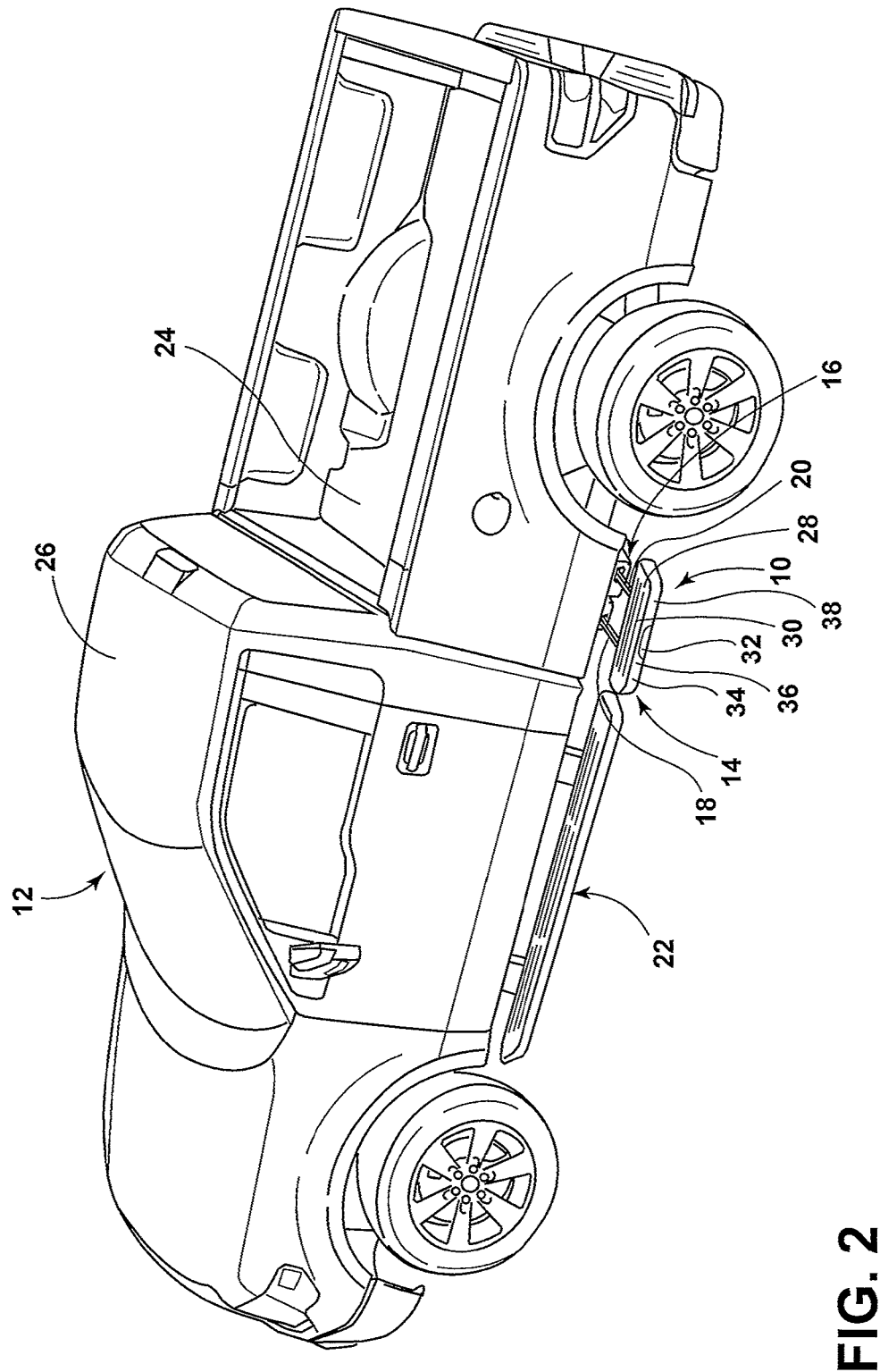
FIG. 2 illustrates the step assembly of FIG. 1, wherein the box step is positioned in a deployed position.

Referring to FIGS. 1 and 2, a step assembly 10 is shown provided on a vehicle 12 generally embodied as a pickup truck. The step assembly 10 is mounted to the underside of the vehicle 12 and includes a box step 14 that extends in a generally longitudinal direction relative to the vehicle 12. The step assembly 10 also includes a drive mechanism 16 (FIG. 2) having one or more arms 18, 20 that are coupled to the box step 14 and configured to move the box step 14 between a stowed position (FIG. 1) and a deployed position (FIG. 2). The arms 18, 20 are depicted in the present embodiment as being substantially straight, thereby effectuating linear movement of the box step 14. The arms 18, 20 may be substantially unitary in construction or may be configured with telescoping members. In alternative embodiments, the arms 18, 20 may be curved such that movement of the box step 14 occurs via a swinging motion.

In the depicted embodiment, the step assembly 10 is generally shown disposed between a retractable running board 22 and a truck bed 24 of the vehicle 12. By virtue of its placement on the vehicle 12, a user may more easily access areas of the truck bed 24 that are directly behind a cabin 26 of the vehicle 12 without having to climb into the truck bed 24 from a ground level. This is accomplished by deploying the box step 14 to the deployed position and stepping on a step pad 28 of the box step 14 to gain additional clearance into the truck bed 24. The step pad 28 is generally planar and defines a top surface of the box step 14. The step pad 28 may include one or more longitudinal grooves 30 therein to provide traction for a user standing thereon.

According to one embodiment, the box step 14 may be deployed from the stowed position by pressing a release button 32 provided centrally on an outer side 34 of the box step 14 that is distal to the vehicle 12. Given its proximity to the ground level, a user may use his or her foot to press the release button 32. In doing so, the arms 18, 20 may become unlatched, thereby causing the box step 14 to move to the deployed position. To return the box step 14 to the stowed position, the user may use his or her foot to push the box step 14 toward the vehicle 12 until the arms 18, 20 become latched to secure the box step 14 in the stowed position. For example, the user may use his or her foot to push against points 36 or 38 on the outer side 34 of the box step 14 in order to return the box step 14 to the stowed position. In such a configuration, the arms 18, 20 may be biased to the deployed position when unlatched to ensure that the box step 14 is sufficiently stable for a user standing thereon. As such, a requisite amount of force may be needed to return the step box 14 to the stowed position. Accordingly, it should be apparent that the drive mechanism 16 may be entirely mechanical in nature such that movement of the arms 18, 20 is restricted until the arms 18, 20 become unlatched by pressing the release button 32. However, it is contemplated that the drive mechanism 16 may be electromechanical in nature such that the pressing of the release button 32 causes an actuator (e.g., a motor) to move the arms accordingly. The actuator may also be responsible for returning the box step 14 to the stowed position. Thus, it is to be understood that the above-described means of actuating the arms 18, 20 are exemplary in purpose and those skilled in the art will recognize a multitude of ways in which to deploy and return the box step 14 once the release button 32 is pressed. In assembly, the box step 14 may be primarily constructed from metal or a metal alloy (e.g., steel). The step pad 28 may be constructed from a black ultraviolet (UV) stable plastic. The release button 32 may be molded from a polymer such as an impact modified UV stable polycarbonate.

Figure 3:
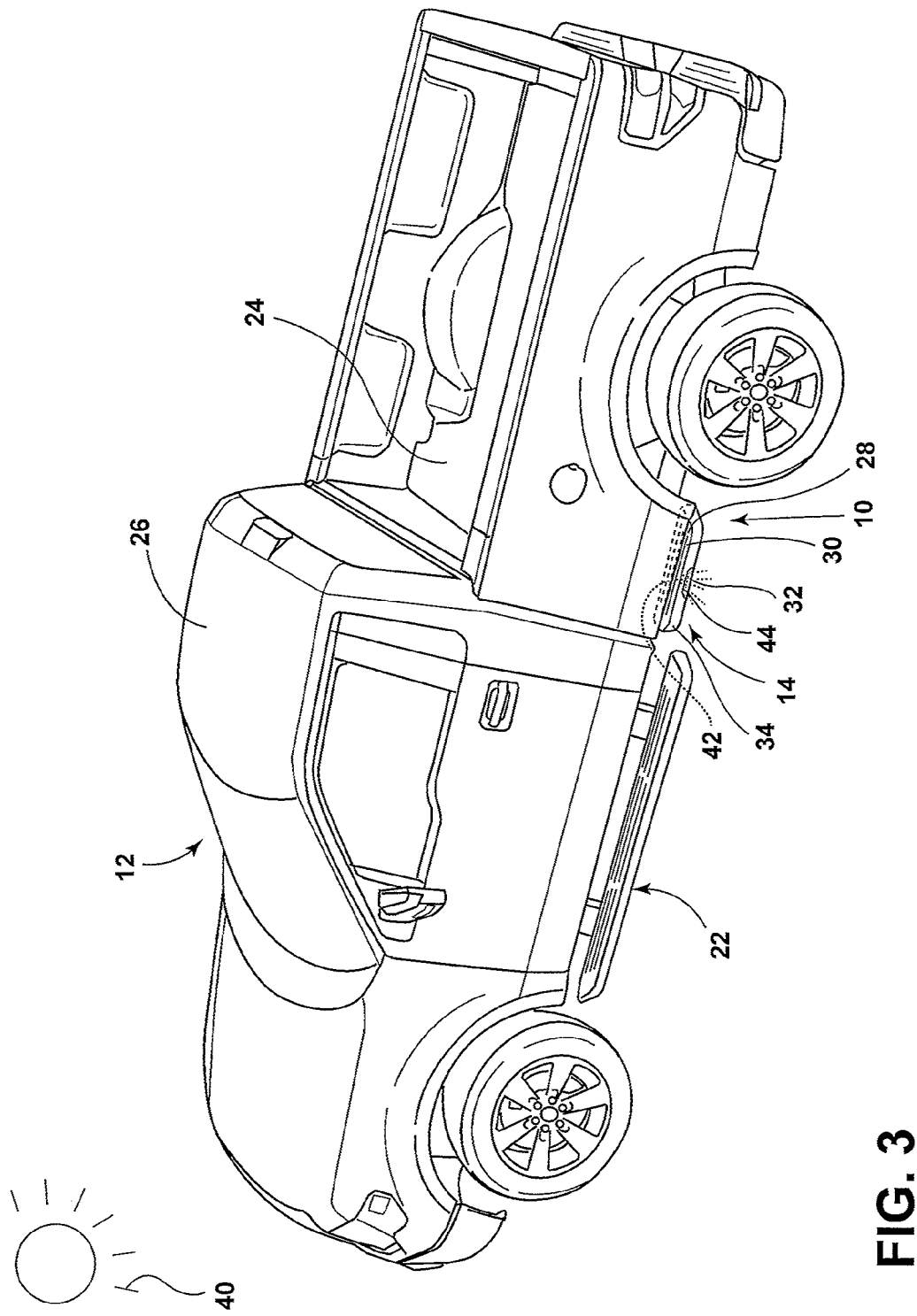
FIG. 3 illustrates the step assembly of FIG. 1, wherein a release button of the box step is in an illumination state.

Referring to FIG. 3, the release button 32 may be configured to illuminate as represented by the dashed lines stemming therefrom in order to assist a user in visibly locating the release button 32 in dark conditions while also imparting a stylistic element to the vehicle 12. In the present embodiment, the release button 32 may be made to illuminate by way of luminescence. For example, the release button 32 may include one or more photoluminescent materials molded therein or otherwise coupled thereto that luminesce in response to an excitation light. The excitation light may be provided from an external light source such as sunlight 40 and/or an internal light source such as one or more light-emitting diodes (LEDs) 42 disposed inside the box step 14 and oriented to backlight visible areas of the release button 32. However, the LED(s) 42 may be elsewhere located, if desired. According to one embodiment, the release button 32 is molded from a polymer containing a mixture of long-persistence phosphors ranging from 0.1 to 25%, which are exemplarily shown in FIG. 3 by reference numeral 44 but are generally not visible to the eye. The polymer may be an impact modified UV stable polycarbonate having sufficient optical clarity such that excitation light is able to be transmitted to the long-persistence phosphors 44.

As defined herein, long-persistence phosphors are generally able to store excitation light and release light gradually, for a period of several minutes or hours, once the excitation light ceases to be provided. The decay time may be defined as the time between the end of excitation and the moment when the light intensity of the release button 32 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art. Based on the availability of excitation light, it may be possible for the release button 32 to luminesce at or above an intensity of 0.32 mcd/m$^2$ after being exposed to the excitation light for a period of 30 minutes, after which the long-persistent phosphors 44 will glow intensely for one or more hours and continue to emit a perceptible glow for upwards of 24 hours or more.

The long-persistence phosphors 44 may correspond to alkaline earth aluminates and silicates, for example doped di-silicates, or any other compound that is capable of emitting light for a period of time once excitation light is no longer present. The long-persistence phosphors 44 may be doped with one or more ions, which may correspond to rare earth elements, for example, $Eu^{2+}$, $Tb^{3+}$ and/or $Dy^3$. According to one embodiment, the long-persistence phosphors 44 may range from 10% to about 15% and the release button 32 may also include variable amounts of stabilizing and performance-enhancing additives based on the weight of the formulation.

In operation, the long-persistence phosphors 44 may be formulated to convert sunlight 40 (i.e., UV light) into visible light found in a conventional RGB color scale, including white light. Additionally or alternatively, the long-persistence phosphors 44 may be formulated to convert various colored light supplied by LED(s) 42 into visible light. Thus, it is to be understood that any long-persistence phosphor known in the art may be utilized without departing from the teachings provided herein. Moreover, it is contemplated that other phosphors, which do not necessarily exhibit long-persistence qualities, may also be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A step assembly of a vehicle, comprising:
   a box step provided separate from a running board and having a release button that illuminates; and
   a drive mechanism having one or more arms coupled to the box step and configured to unlatch and move the step pad from a stowed position to a deployed position when the release button is pressed, wherein movement between the stowed and deployed positions occurs through linear motion.

2. The step assembly of claim 1, wherein the vehicle is a pickup truck and the box step is disposed between a running board and a truck bed of the vehicle.

3. The step assembly of claim 1, wherein the box step is returned to the stowed position by applying a force against the box in a direction toward the vehicle.

4. The step assembly of claim 1, wherein the release button is centrally provided at an outer side of the box step that is distal to the vehicle.

5. A step assembly of a vehicle, comprising:
a box step provided separate from a running board and having a release button that luminesces in response to excitation light; and
a drive mechanism configured to move the step pad from a stowed position to a deployed position when the release button is pressed, wherein movement between the stowed and deployed positions occurs through linear motion, and wherein the box step is returned to the stowed position by applying a force against the box in a direction toward the vehicle.

6. The step assembly of claim 5, wherein the box step is molded from a polymer containing a mixture of long-persistence phosphors.

7. The step assembly of claim 5, wherein the drive mechanism comprises one or more arms coupled to the box step and configured to move the box step between the stowed and deployed positions.

8. The step assembly of claim 7, wherein pressing the release button causes the one or more arms to become unlatched and biases the one or more arms to the deployed position.

9. The step assembly of claim 5, wherein the release button is centrally provided at an outer side of the box step that is distal to the vehicle.

10. The step assembly of claim 5, further comprising a light source disposed inside the box step and configured to supply excitation light to the release button.

11. A step assembly of a vehicle, comprising:
a box step having a release button that luminesces in response to excitation light; and
a drive mechanism having one or more arms coupled to the box step and configured to move the step pad from a stowed position to a deployed position when the release button is pressed, the one or more arms configured to move laterally with respect to the vehicle, wherein the box step is returned to the stowed position by applying a force against the box in a direction toward the vehicle.

12. The step assembly of claim 11, wherein the box step is molded from a polymer containing a mixture of long-persistence phosphors.

13. The step assembly of claim 11, wherein the vehicle is a pickup truck and the box step is disposed between a running board and a truck bed of the vehicle.

14. The step assembly of claim 11, wherein the drive mechanism comprises a pair of parallel arms.

15. The step assembly of claim 11, wherein pressing the release button causes the pair of parallel arms to become unlatched and biases the pair of parallel arms to the deployed position through a-linear motion.

16. The step assembly of claim 11, wherein the release button is centrally provided at an outer side of the box step that is distal to the vehicle.

\* \* \* \* \*